UNITED STATES PATENT OFFICE.

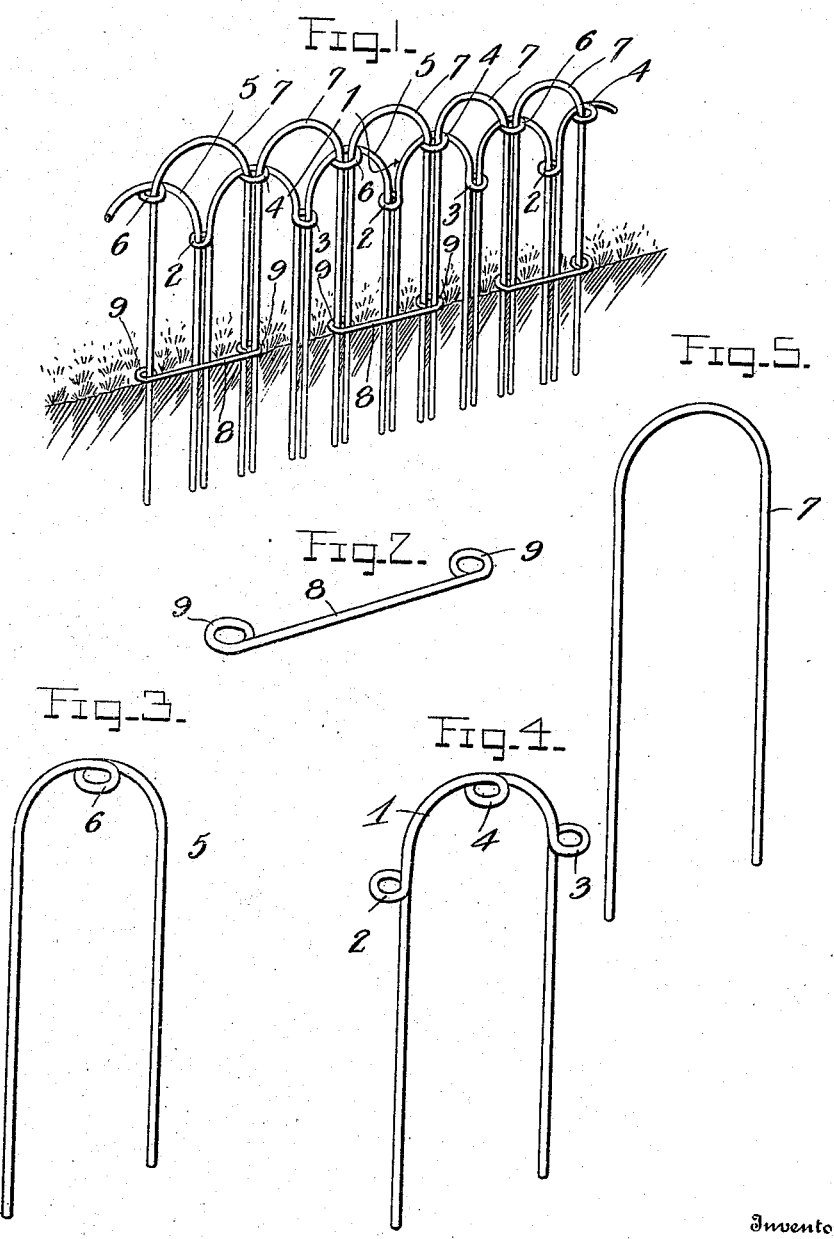

ABRAHAM LINCOLN J. MILLER, OF NEWBURGH, NEW YORK.

WICKET FENCE OR GUARD.

No. 899,605.     Specification of Letters Patent.     Patented Sept. 29, 1908.

Application filed May 28, 1908. Serial No. 435,454.

*To all whom it may concern:*

Be it known that I, ABRAHAM LINCOLN J. MILLER, a citizen of the United States, residing at Newburgh, in the county of Orange and State of New York, have invented new and useful Improvements in Wicket Fences or Guards, of which the following is a specification.

This invention relates to an improved structure for protecting lawns, flower borders or similar places.

The object of the invention is to provide a protective guard or inclosure for grass plots, flower borders and the like, which while it affords ample protection for the portion inclosed in no way mars the general appearance or interferes with the open effect, such as would be the case if a fence were employed.

Another object is to provide an inclosure of this character the members of which may be readily inserted or removed and which may be conveniently stored when desired.

With these and other objects in view, the invention consists of certain novel features of construction, combination and arrangement of parts, as will be more fully described and particularly pointed out in the appended claims.

In the accompanying drawings, Figure 1 is a perspective view of a portion of an inclosure constructed in accordance with this invention, and shown applied, Fig. 2 is a perspective view of the connecting or gaging ground rod or wire, Fig. 3 is a perspective view of one of the wickets used in constructing this improved inclosure, Fig. 4 is a similar view of another of the wickets, and Fig. 5 is a perspective view of a plain wicket which is used in the construction.

In the embodiment shown, the inclosing structure is composed of three different forms of wickets or inverted U-shaped members, which may be composed of any suitable or any desired material or of any desired height, and which are connected and arranged as shown in Fig. 1. In the arrangement herein shown a plurality of wickets as 1, are provided, having eyes 2 and 3, arranged in their opposite legs near their upper curved ends and with an eye 4, arranged at the center of the curved portion thereof. These eyes extend laterally from the wicket at any desired angle to receive the other members, as hereinafter described. Wickets as 5, are designed for use in connection with the wickets 1 and are provided at the center of the curved portion thereof with laterally extending eyes as 6, the legs of said members 5 being preferably straight, and are connected with the wickets 1 in a manner which will be hereinafter described. Plain wickets 7 of ordinary construction are also used in the structure shown in Fig. 1 and are connected with the other members in a manner to be described.

The gaging rod or wire is designed to be laid on the ground where the inclosure is to be erected, and said wire is provided with longitudinally spaced loops or eyes as 9, through which the legs of the wickets are designed to be passed when the inclosure is being constructed. This gaging wire serves to hold the legs of the wickets the desired distance apart to prevent their being bulged outwardly or pressed inwardly, and it may be constructed either as a continuous wire or in sections, as desired.

In the construction of this improved inclosure the gaging wire is preferably laid around the plot to be inclosed and a plurality of wickets as 1, are driven into the ground through the loops 9 of the gaging rod 8 and are spaced from each other the width of a wicket for a purpose which will now be described. After the wickets 1 have been erected the wickets 5 having a single central loop or eye 6 are connected therewith and driven into the ground by passing the legs of said wickets 5 through the eyelet 3 of one of the wickets 1 and the eyelet 2 of the next adjacent wicket 1 with the legs thereof passing through the loops as 9, on the gaging wire through which the legs of the wickets 1 have already been passed. These wickets 1 and 5 are driven into the ground a suitable distance to bring the curved heads thereof in substantially the same horizontal plane. The plain wickets 7 which are preferably made of a height greater than that of the wickets 1 and 5 are connected with the wickets 1 and 5 by passing the legs of said wickets 7 through the central eyes as 6 of the wickets 5 and through the central eyes 4 of the wickets 1. The legs of two adjacent wickets 7 being passed through the same eyes 4 and 6 and the free ends thereof are driven into the ground a suitable distance, the legs of the wickets 7 being arranged intermediately between the legs of the other members 1 and 5. It will thus be seen that the wickets as 1 and 5 are arranged alternately, with the wickets as 7, spanning the space between the heads thereof and with the legs thereof extending centrally between the legs of each of said members 1 and 5 whereby a compact, firm and effective inclosure is produced. These wickets may be made of any desired size to form an inclosure for keeping out either large or small animals, such as dogs, cats, chickens and the like, and it is specially designed for preventing persons from accidentally stepping on the portion inclosed.

From the foregoing description, taken in connection with the accompanying drawings, the construction and operation of the invention will be readily understood without requiring a more extended explanation.

Various changes in the form proportion and the minor details of construction may be resorted to without departing from the principle or sacrificing any of the advantages of this invention as defined in the appended claims.

I claim as my invention:—

1. An inclosing structure composed of a plurality of wicket members each having eyes formed at opposite sides thereof, and a loop or eye arranged intermediately of said side eyes, a plurality of wickets arranged between said eye-carrying members with the legs thereof engaging the side eyes of the first mentioned wickets and having central eyes, and a plurality of plain wickets with the legs thereof extending through the central eyes of the adjacent wickets.

2. An inclosing structure composed of a plurality of wicket members each having eyes formed at opposite sides thereof, and an eye arranged intermediately of said side eyes, a plurality of wickets arranged between said eye-carrying members with the legs thereof engaging the side eyes of the first mentioned wickets and having central eyes, and a plurality of plain wickets with the legs thereof extending through the central eyes of the adjacent wickets, and a gage member having longitudinally spaced means for engagement with the legs of a plurality of said wickets.

3. An inclosing structure comprising a plurality of wickets arranged in longitudinal alinement and each provided with a centrally disposed eye, and a plurality of plain wickets with the legs of two adjacent plain wickets passing through the eye of one of the adjacent eye carrying wickets.

In testimony whereof I have signed my name to this specification in the presence of two subscribing witnesses.

ABRAHAM LINCOLN J. MILLER.

Witnesses:
WILLIAM J. WYGANT,
HENRY W. CHADEAYNE.